(12) United States Patent
Shangguan et al.

(10) Patent No.: US 12,463,309 B2
(45) Date of Patent: Nov. 4, 2025

(54) ELECTRODE ASSEMBLY, BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Huihui Shangguan, Ningde (CN); Haizu Jin, Ningde (CN); Daichun Tang, Ningde (CN); Xinxin Du, Ningde (CN); Ziyu Bai, Ningde (CN); Ruihuan Qin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 169 days.

(21) Appl. No.: 18/159,684

(22) Filed: Jan. 26, 2023

(65) Prior Publication Data

US 2023/0170592 A1    Jun. 1, 2023

Related U.S. Application Data

(63) Continuation of application No. PCT/CN2021/127714, filed on Oct. 29, 2021.

(30) Foreign Application Priority Data

Dec. 31, 2020  (CN) ........................ 202023344172.0

(51) Int. Cl.
   *H01M 50/586*  (2021.01)
   *H01M 50/538*  (2021.01)
   *H01M 50/593*  (2021.01)

(52) U.S. Cl.
   CPC ....... *H01M 50/593* (2021.01); *H01M 50/538* (2021.01); *H01M 50/586* (2021.01); *H01M 2220/20* (2013.01)

(58) Field of Classification Search
   CPC .......................... H01M 50/538; H01M 50/586
   See application file for complete search history.

(56) References Cited

U.S. PATENT DOCUMENTS

6,335,114 B1   1/2002   Ueshima et al.
10,115,997 B2  10/2018  Schneider et al.
(Continued)

FOREIGN PATENT DOCUMENTS

CN    1525591 A    9/2004
CN   110178247 A   8/2019
(Continued)

OTHER PUBLICATIONS

The Japan Patent Office (JPO) Notification of Reasons for Refusal for Application No. 2022-567035 Dec. 25, 2023 10 Pages (including translation).

(Continued)

*Primary Examiner* — Jonathan G Jelsma
(74) *Attorney, Agent, or Firm* — ANOVA LAW GROUP, PLLC

(57) ABSTRACT

An electrode assembly includes a first electrode plate and a second electrode plate. The first electrode plate includes a first body portion and a tab. The first body portion has a first end portion in a first direction. The tab is coupled to the first end portion. The second electrode plate includes a second body portion and an insulation portion coupled to the second body portion. The first body portion and the second body portion are stacked in a stacking direction perpendicular to the first direction. The second body portion has a second end portion close to the tab in the first direction. The insulation portion covers at least part of the second end portion so as to separate the tab from the second end portion when the tab is bent.

20 Claims, 14 Drawing Sheets

(56) References Cited

U.S. PATENT DOCUMENTS

| | | | | |
|---|---|---|---|---|
| 2003/0099880 | A1* | 5/2003 | Park | H01M 50/571 |
| | | | | 429/246 |
| 2016/0141589 | A1* | 5/2016 | Kang | H01M 50/46 |
| | | | | 429/211 |
| 2016/0359189 | A1* | 12/2016 | Fukatsu | H01M 4/133 |
| 2017/0317390 | A1 | 11/2017 | Sato | |
| 2018/0366786 | A1* | 12/2018 | Fujii | H01M 4/13 |
| 2019/0386285 | A1* | 12/2019 | Takahashi | H01M 10/0525 |
| 2020/0075920 | A1* | 3/2020 | Murai | H01M 10/0587 |

FOREIGN PATENT DOCUMENTS

| | | |
|---|---|---|
| CN | 210110993 U | 2/2020 |
| CN | 210535760 U | 5/2020 |
| CN | 111326699 A | 6/2020 |
| CN | 214254666 U | 9/2021 |
| EP | 1278253 B1 | 5/2013 |
| JP | 2001093583 A | 4/2001 |
| JP | 2003151535 A | 5/2003 |
| JP | 2004259625 A | 9/2004 |
| JP | 2019003789 A | 1/2019 |
| JP | 2019079711 A | 5/2019 |
| KR | 20130050616 A | 5/2013 |
| KR | 102232115 B1 | 3/2021 |
| WO | 2017057762 A1 | 4/2017 |
| WO | 2018084162 A1 | 5/2018 |
| WO | 2020130001 A1 | 6/2020 |

OTHER PUBLICATIONS

The World Intellectual Property Organization (WIPO) International Search Report for PCT/CN2021/127714 Jan. 26, 2022 6 pages (with translation).

The European Patent Office (EPO) The Extended European Search Report for 21913437.6 Nov. 20, 2023 7 Pages.

Japan Patent Office (JPO) Decision to Grant a Patent For JP Application No. 2022-567035 May 20, 2024 5 Pages (including translation).

Korean Intellectual Property Office (KIPO) Office Action 1 for Application No. 10-2022-7038354 Sep. 13, 2024 13 Pages (including translation).

Korean Intellectual Property Office (KIPO) Notice of Allowance for Application No. 10-2022-7038354 Dec. 20, 2024 5 Pages (including translation).

* cited by examiner

ELECTRODE ASSEMBLY, BATTERY CELL, BATTERY, AND ELECTRIC APPARATUS

CROSS-REFERENCE TO RELATED APPLICATIONS

This application is a continuation of International Application No. PCT/CN2021/127714, which claims priority to Chinese Patent Application No. 202023344172.0, filed on Dec. 31, 2020 and entitled "ELECTRODE ASSEMBLY, BATTERY CELL, BATTERY, AND ELECTRIC APPARATUS", the entire contents of both of which are incorporated herein by reference.

TECHNICAL FIELD

This application relates to the field of batteries, and in particular, to an electrode assembly, a battery cell, a battery, and an electric apparatus.

BACKGROUND

Energy conservation and emission reduction are keys to sustainable development in automobile industry. Under this circumstance, electric vehicles have become an important part for sustainable development in automobile industry due to the advantage of energy conservation and emission reduction. Battery technologies are an important factor related to the development of the electric vehicles.

In the development of the battery technologies, in addition to performance improvement, safety is another non-negligible issue of batteries. If safety of a battery cannot be guaranteed, the battery is unusable. Therefore, how safety of the battery is enhanced requires an urgent solution in the battery technology.

SUMMARY

This application provides an electrode assembly, a battery cell, a battery, and an electric apparatus, which can reduce a risk of short circuits and improve safety performance.

According to a first aspect, this application provides an electrode assembly, which includes: at least one first electrode plate including a first body portion and a first tab, where the first body portion has a first end portion in a first direction, and the first tab is connected to the first end portion; and at least one second electrode plate, whose polarity is opposite to that of the first electrode plate, where the second electrode plate includes a second body portion and a second insulation portion connected to the second body portion, the first body portion and the second body portion are stacked in a direction perpendicular to the first direction, the second body portion has a second end portion close to the first tab in the first direction, and the second insulation portion covers at least part of the second end portion so as to separate the first tab from the second end portion when the first tab is bent.

In an embodiment of this application, the second insulation portion is provided to reduce a risk of the first tab contacting the second end portion when the first tab is bent, improving safety performance of the electrode assembly.

In some embodiments, the second insulation portion includes a second coverage zone and a second connection zone connected to the second coverage zone, where the second coverage zone is disposed on a side of the second body portion in the first direction and covers at least part of the second end portion, and the second connection zone is connected to the second body portion. The second connection zone is at least partially located between the first body portion and the second body portion so as to separate the second body portion from the first tab when the first tab is inserted between the first body portion and the second body portion. The second connection zone can reduce a risk of the first tab contacting the second body portion when the first tab is inserted between the first body portion and the second body portion, improving safety performance.

In some embodiments, the second connection zone is provided in two, which are disposed on two sides of the second body portion in a stacking direction respectively. The two second connection zones can increase connection area between the second insulation portion and the second body portion, enhancing connection strength between the second insulation portion and the second body portion and reducing a risk of the second insulation portion coming off.

In some embodiments, a ratio of a size of the second connection zone in the first direction to a size of the second body portion in the first direction ranges from 0.5% to 6%.

In some embodiments, the first electrode plate further includes a first insulation portion, where the first insulation portion includes a first coverage zone and a first connection zone connected to the first coverage zone, and the first coverage zone is disposed on a side of the first body portion in the first direction and covers at least part of the first end portion. The first connection zone is at least partially located between the first body portion and the second body portion and is connected to the first body portion. The first insulation portion can cover at least part of the first end portion, thereby reducing a risk of burrs on the first end portion piercing a separator and improving safety performance.

In some embodiments, the first electrode plate is a positive electrode plate, and the second electrode plate is a negative electrode plate. In a direction pointing away from the first tab and parallel to the first direction, an edge of the second connection zone farther away from the second coverage zone does not exceed an edge of the first connection zone farther away from the first coverage zone. In this way, a portion of the second active material layer that is not covered by the second connection zone can cover a portion of the first active material layer that is not covered by the first connection zone, providing more space to intercalate the metal ions and reducing a risk of lithium precipitation.

In some embodiments, in the direction pointing away from the first tab and parallel to the first direction, a gap between the edge of the second connection zone farther away from the second coverage zone and the edge of the first connection zone farther away from the first coverage zone is greater than 0.05 mm, so that the portion of the second active material layer that is not covered by the second connection zone has a larger area for intercalating more metal ions, thereby reducing the risk of lithium precipitation.

In some embodiments, the first body portion includes a first current collection zone, a first active material layer, and a first protective layer, where the first active material layer is applied on a surface of the first current collection zone, and the first protective layer is applied on a surface of the first current collection zone and connected to the first active material layer. The first protective layer is located on a side of the first active material layer in the first direction and close to the first tab. The first connection zone is fixed on the first protective layer, and in a direction pointing away from the first tab and parallel to the first direction, an edge of the first connection zone farther away from the first coverage zone does not exceed the first protective layer. The first connection zone does not cover the first active material layer so that the first connection zone does not obstruct deintercalating metal ions from the first active material layer, improving cycling performance of the electrode assembly.

In some embodiments, the first body portion has a third end portion in the first direction farther away from the first end portion, and the second body portion has a fourth end portion in the first direction farther away from the second end portion. The second electrode plate further includes a second tab, where the second tab is connected to the second end portion or the fourth end portion.

In some embodiments, the first electrode plate further includes a third insulation portion, where the third insulation portion is connected to the first body portion and covers at least part of the third end portion. The third insulation portion can reduce a risk of burrs on the third end portion piercing a separator, improving safety performance.

In some embodiments, the second electrode plate further includes a fourth insulation portion, where the fourth insulation portion is connected to the second body portion and covers at least part of the fourth end portion. The fourth insulation portion can reduce a risk of burrs on the fourth end portion piercing a separator, improving safety performance.

In some embodiments, the second insulation portion has a porous structure for metal ions to pass through. The metal ions are able to pass through the second insulation portion to reduce resistance of the second insulation portion to transport the metal ions, helping intercalate and deintercalate the metal ions.

In some embodiments, the electrode assembly further includes a separator configured to separate the first electrode plate from the second electrode plate. Thickness of the second insulation portion is greater than thickness of the separator. The second insulation portion has greater thickness and strength than the separator, and is difficult to be pierced by burrs on the second end portion, thus reducing a risk of short circuits.

According to a second aspect, this application provides a battery cell, which includes: a housing with an accommodating cavity and an opening; at least one electrode assembly according to any one of the embodiments in the first aspect accommodated in the accommodating cavity; and a cover plate configured to close the opening of the housing.

According to a third aspect, this application further provides a battery, including a box body; and at least one battery cell according to the second aspect, where the battery cell is accommodated in the box body.

According to a fourth aspect, this application further provides an electric apparatus, where the electric apparatus is configured to receive power supplied by the battery according to the third aspect.

BRIEF DESCRIPTION OF DRAWINGS

The following describes features, advantages, and technical effects of the example embodiments of this application with reference to the accompanying drawings.

Figure 1:
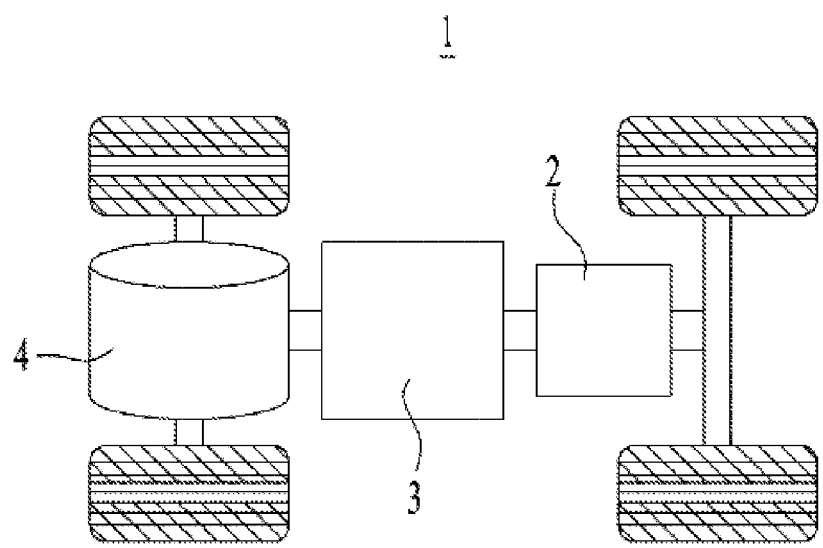
FIG. 1 is a schematic structural diagram of a vehicle according to an embodiment of this application.

In the accompanying drawings, the figures are not drawn to scale.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application belongs. The terms used in the specification of this application are merely intended to describe the specific embodiments but not intended to constitute any limitation on this application. The terms "include", "comprise", and any variations thereof in the specification and claims of this application and the foregoing description of the drawings are intended to cover non-exclusive inclusions. In the specification, claims, or accompanying drawings of this application, the terms "first", "second", and the like are intended to distinguish between different objects but do not indicate a particular order or a subordinate relationship.

An "embodiment" mentioned in this application means that specified features, structures, or characteristics described with reference to this embodiment may be included in at least one embodiment of this application. The word "embodiment" in various positions in the specification does not necessarily refer to a same embodiment, or an independent or alternative embodiment that is exclusive of other embodiments. A person skilled in the art can clearly and implicitly understand that the embodiments described in this application can be combined with other embodiments.

In the descriptions of this application, it should be noted that unless otherwise specified and defined explicitly, the terms "installment", "link", "connection", and "attachment" should be understood in their general senses. For example, the terms may be a fixed connection, a detachable connection, or an integrated connection, or may be a direct connection, an indirect connection through an intermediate medium, or an internal connection between two elements. A person of ordinary skills in the art can understand specific meanings of these terms in this application based on specific situations.

The term "and/or" in this application describes only an association relationship for describing associated objects and represents that three relationships may exist. For example, A and/or B may represent the following three cases: A alone, both A and B, and B alone. In addition, the character "/" in this application generally indicates an "or" relationship between the associated objects.

In this application, "a plurality of" means two (inclusive) or more. Similarly, "a plurality of groups" means two (inclusive) or more groups, and "a plurality of pieces" means two (inclusive) or more pieces.

In this application, "parallel" includes not only absolute parallel but also approximately parallel commonly known in engineering. In addition, "vertical" also includes not only absolute vertical but also approximately vertical commonly known in engineering.

In this application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. This is not limited in the embodiments of this application. The battery cell may be cylindrical, flat, rectangular, or in another shape, and this is also not limited in the embodiments of this application. Battery cells are usually categorized into three types depending on their packaging: cylinder battery cell, prismatic battery cell, and pouch battery cell, and this is also not limited in the embodiments of this application.

The battery mentioned in the embodiments of this application is a single physical module that includes one or more battery cells for providing a higher voltage and capacity. For example, the battery mentioned in this application may include a battery module, a battery pack, or the like. A battery generally includes a box body configured to package one or more battery cells. The box body can prevent a liquid or another foreign matter from affecting charging or discharging of the battery cell.

The battery cell and the battery described in the embodiments of this application are both applicable to electric apparatuses. The battery cell and the battery supply electric power to the electric apparatuses. For example, an electric apparatus may be a mobile phone, a portable device, a laptop, an electric scooter, an electric vehicle, a steamship, a spacecraft, an electric toy, an electric tool, and the like. For example, the spacecraft includes an airplane, a rocket, a space shuttle, a spaceship, and the like. The electric toy includes a fixed or mobile electric toy, such as a game console, an electric vehicle toy, an electric ship toy, and an electric airplane toy. The electric tool includes an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

It should be understood that the technical solution described in the embodiments of this application is not only applicable to the devices described above, but also applicable to all devices using batteries. However, for brevity of description, in the following embodiments, a vehicle is used as an example for description.

FIG. 1 is a schematic structural diagram of a vehicle 1 according to an embodiment of this application. As shown in FIG. 1, the vehicle 1 may be an oil-fueled vehicle, a gas-powered vehicle, or a new energy vehicle. The new energy vehicle may be a battery electric vehicle, a hybrid electric vehicle, an extended-range electric vehicle, or the like. A battery 2, a controller 3, and a motor 4 may be disposed inside the vehicle 1, and the controller 3 is configured to control the battery 2 to supply power to the motor 4. For example, a battery 2 may be disposed at the bottom, the front, or the rear of the vehicle 1. The battery 2 may be configured to supply power to the vehicle 1. For example, the battery 2 may be used as an operational power supply for the vehicle 1, and may be applied to a circuit system of the vehicle 1, for example, may be configured to supply power to meet the start, navigation, and driving requirements of the vehicle 1. In another embodiment of this application, the battery 2 not only can be used as the operational power supply for the vehicle 1, but also can be used as a driving power supply for the vehicle 1, to totally or partially replace the fossil fuel or the natural gas to provide driving power for the vehicle 1.

To meet different power usage requirements, the battery 2 may include a plurality of battery cells, where the plurality of battery cells may be connected in series, in parallel, or in series and parallel, and being connected in series and parallel is a combination of series and parallel connections. In the battery 2, the plurality of battery cells may be directly connected in series, in parallel, or in series and parallel. Certainly, the plurality of battery cells may be connected in series, in parallel, or in series and parallel to form a battery module first, and then a plurality of battery modules are connected in series, in parallel, or in series and parallel to form a battery 2. In other words, the plurality of battery cells may directly constitute a battery 2, or may first constitute a battery module, and then a plurality of battery modules constitute a battery 2.

Figure 2:
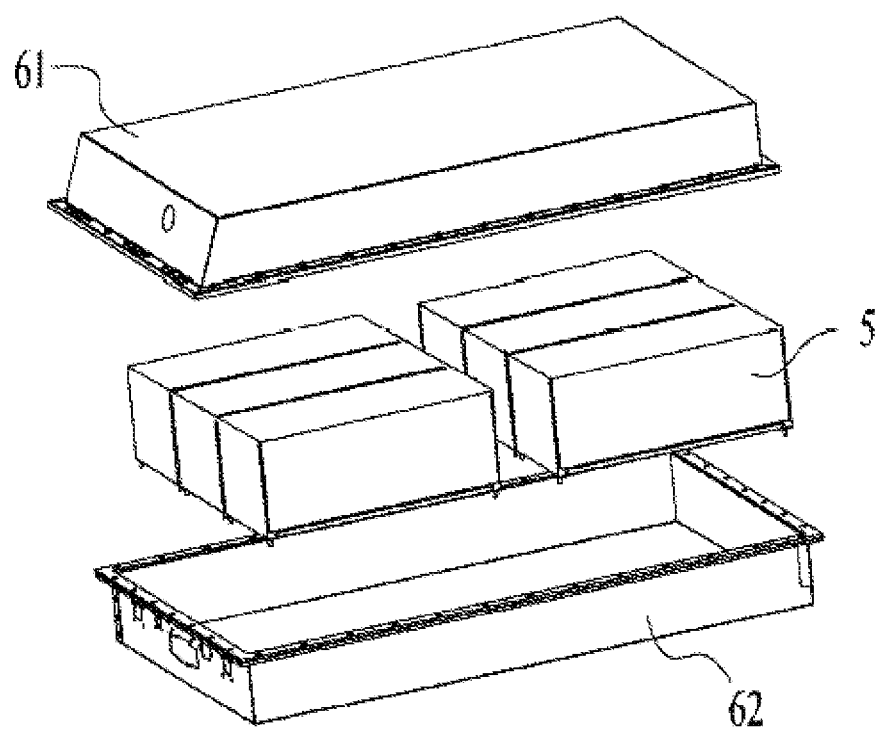
FIG. 2 is a schematic structural diagram of a battery according to an embodiment of this application.

FIG. 2 is a schematic structural diagram of a battery 2 according to an embodiment of this application. As shown in FIG. 2, the battery 2 may include a plurality of battery cells 5. The battery 2 may further include a box body (or referred to as a cover body), an inside of the box body is a hollow structure, and the plurality of battery cells 5 are accommodated in the box body. As shown in FIG. 2, the box body may include two portions, which are referred to as a first box body portion 61 and a second box body portion 62 respectively herein, and the first box body portion 61 and the second box body portion 62 are snap-fitted together. Shapes of the first box body portion 61 and the second box body portion 62 may be determined based on a shape of a structure formed by combining the plurality of battery cells 5, and the first box body portion 61 and the second box body portion 62 each may have an opening. For example, the first box body portion 61 and the second box body portion 62 each may be a hollow cuboid and have only one face with an opening, the opening of the first box body portion 61 is disposed opposite the opening of the second box body portion 62, and the first box body portion 61 and the second box body portion 62 are snap-fitted to form a box body with an enclosed chamber. After the plurality of battery cells 5 are connected in parallel, series, or series and parallel, they are placed in the box body formed after the first box body portion 61 and the second box body portion 62 are snap-fitted together.

Optionally, the battery 2 may further include other structures. Details are not described herein. For example, the battery 2 may further include a busbar (not shown in the figure), and the busbar is configured to implement an electrical connection between the plurality of battery cells 5, such as a parallel connection, a series connection, or a series and parallel connection. Specifically, the busbar may implement the electrical connection between the battery cells 5 by connecting electrode terminals of the battery cells 5. Further, the busbar may be fastened on the electrode terminals of the battery cells 5 by welding. Electrical energy of the plurality of battery cells 5 may be further led out through the box body by a conductive mechanism. Optionally, the conductive mechanism may also belong to the busbar.

Figure 3:
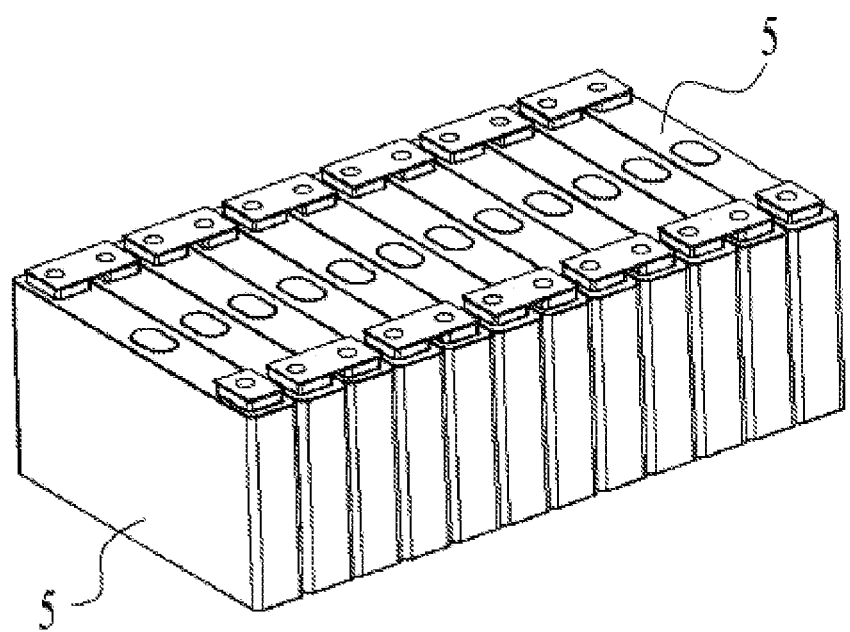
FIG. 3 is a schematic diagram of a battery module according to an embodiment of this application.

Based on different power demands, the number of the battery cells 5 may be set in any number. The plurality of battery cells 5 may be connected in series, in parallel, or in series and parallel to implement a greater capacity or power. Because each battery 2 may include a large quantity of battery cells 5, for ease of assembly, the battery cells 5 may be disposed by groups, and each group of battery cells 5 form a battery module. A quantity of battery cells 5 included in a battery module is not limited and can be set according to requirements. For example, FIG. 3 is an example of a battery module. Battery 2 may include a plurality of battery modules, and these battery modules may be connected in series, in parallel, or in series and parallel.

Figure 4:
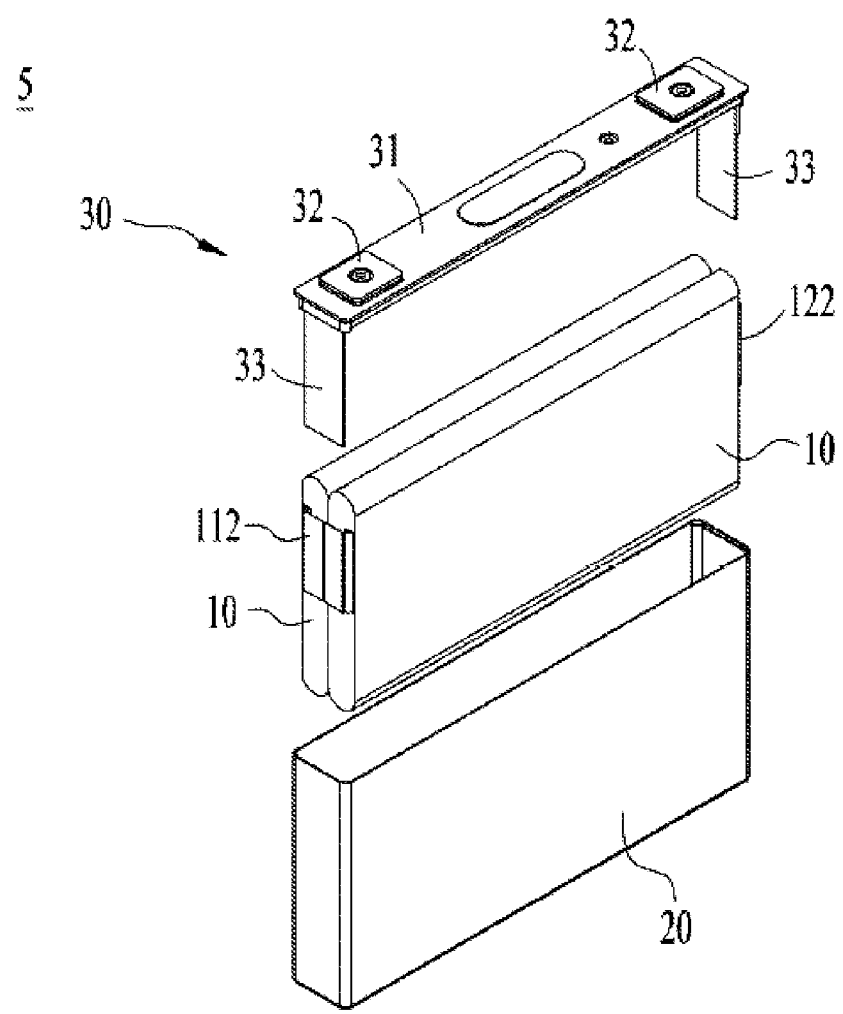
FIG. 4 is a schematic structural diagram of a battery cell according to an embodiment of this application.

FIG. 4 is a schematic structural diagram of a battery cell 5 according to an embodiment of this application. As shown in FIG. 4, the battery cell 5 in this embodiment of this application includes an electrode assembly 10, a housing 20, and an end cover assembly 30, where the housing 20 has an accommodating cavity and an opening, and the electrode assembly 10 is accommodated in the accommodating cavity. The housing 20 is determined based on a shape of a structure formed by combining one or more electrode assemblies 10. For example, the housing 20 may be a hollow cuboid, cube, or cylinder, and the housing 20 has an opening in one of its faces so that the one or more electrode assemblies 10 can be put into the housing 20. For example, under the condition that the housing 20 is a hollow cuboid or cube, a plane of the housing 20 is a face with an opening. To be specific, the plane does not have a wall so that the inside and the outside of the housing 20 can communicate without blocking. The end cover assembly 30 includes an end cover 31. The end cover 31 covers the opening and is connected to the housing 20 so as to close the opening of the housing 20, thus allowing the electrode assembly 10 to be placed inside an enclosed cavity. The housing 20 is filled with an electrolyte, such as a liquid electrolyte.

The end cover assembly 30 may further include two electrode terminals 32. The two electrode terminals 32 may be disposed on the end cover 31. The end cover 31 is usually in a flat plate shape, the two electrode terminals 32 are fastened on the end cover 31, and the two electrode terminals 32 are a positive electrode terminal and a negative electrode terminal. Each of the electrode terminals 32 is provided with a corresponding connection member 33, which may also be referred to as a current collection member. The connection member 33 is configured to electrically connect the electrode assembly 10 and the electrode terminal 32.

Figure 5:
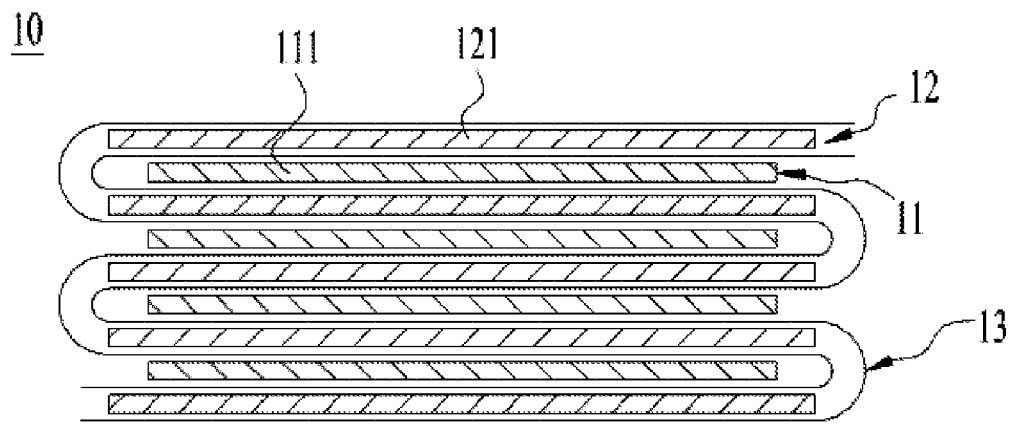
FIG. 5 is a schematic cross-sectional view of an electrode assembly according to an embodiment of this application.

FIG. 5 is a schematic cross-sectional view of an electrode assembly 10 according to an embodiment of this application.

As shown in FIG. 5, the electrode assembly 10 includes at least one first electrode plate 11 and at least one second electrode plate 12, and polarities of the first electrode plate 11 and the second electrode plate 12 are opposite. When the first electrode plate 11 is a negative electrode plate, the second electrode plate 12 is a positive electrode plate; and when the first electrode plate 11 is a positive electrode plate, the second electrode plate 12 is a negative electrode plate.

In some embodiments, the electrode assembly 10 includes a plurality of the first electrode plates 11 and a plurality of the second electrode plates 12. The plurality of the first electrode plates 11 and the plurality of the second electrode plates 12 are stacked alternately. Each of the first electrode plates 11 includes a first body portion 111 and a first tab (not shown in the figure) connected to the first body portion 111, and each of the second electrode plates 12 includes a second body portion 121 and a second tab (not shown in the figure) connected to the second body portion 121. The first body portions 111 of the plurality of the first electrode plates 11 and the second body portions 121 of the plurality of the second electrode plates 12 are stacked alternately. The first body portions 111 and the second body portions 121 are stacked in a direction parallel to thickness direction of the first body portions 111 and thickness direction of the second body portions 121. The first tab protrudes from the first body portion 111, and the second tab protrudes from the second body portion 121. The first tab is configured to be electrically connected to one electrode terminal through one connection member, and the second tab is configured to be electrically connected to the other electrode terminal through the other connection member.

The first body portion 111 is substantially in a flat plate shape and perpendicular to the stacking direction, and the second body portion 121 is substantially in a flat plate shape and perpendicular to the stacking direction. That means the first body portion 111 and the second body portion 121 are arranged in parallel substantially.

The electrode assembly 10 further includes a separator 13 configured to separate the first electrode plate 11 and the second electrode plate 12. In some examples, the separator 13 is provided in two, and each of the separators 13 is reciprocally bent in a Z shape to multiple layers. The separator 13 features electronic insulation and is configured to separate the first electrode plate 11 and the second electrode plate 12 that are adjacent so as to prevent short circuits between the first electrode plate 11 and the second electrode plate 12 that are adjacent. The separator 13 has a large quantity of penetrating micropores to ensure free passage of electrolyte ions and has good permeability performance for lithium ions. Therefore, the separator 13 basically is unable to block passage of lithium ions. For example, the separator 13 includes a separator substrate and a functional layer located on a surface of the separator substrate. The separator substrate may be at least one of polypropylene, polyethylene, ethylene-propylene copolymer, polybutylene terephthalate, and the like. The functional layer may be a mixture layer of ceramic oxide and a binder.

Figure 6:
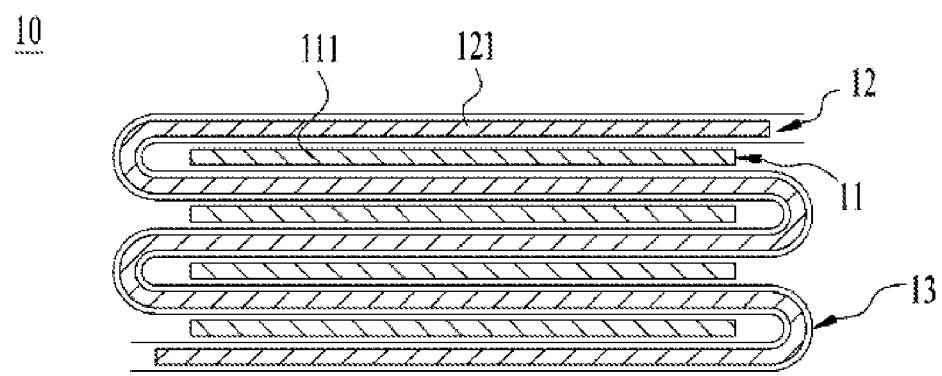
FIG. 6 is a schematic cross-sectional view of another electrode assembly according to an embodiment of this application.

FIG. 6 is a schematic cross-sectional view of another electrode assembly 10 according to an embodiment of this application. As shown in FIG. 6, the electrode assembly 10 according this embodiment of this application includes a plurality of first electrode plates 11 and a plurality of second electrode plates 12. Specifically, a second body portion 121 of the second electrode plate 12 includes a plurality of second flat segments and a plurality of second bending segments. The plurality of second flat segments are stacked, and each of the bending segments connects two adjacent flat segments. The second bending segment is at least partially bent to be arc-shaped. The second body portion 121 is in a continuous structure and is reciprocally bent to form the plurality of second flat segments and the plurality of second bending segments. Each of first body portions 111 is disposed between two adjacent second bending segments. In this case, the first body portion 111 and the second body portion 121 are stacked in a direction parallel to a direction in which the plurality of second flat segments are stacked.

A second tab (not shown in the figure) is connected to the second flat segment. The second electrode plate 12 includes one or more second tabs. In some embodiments, the second tab and the second flat segment are same in quantities and are arranged in one-to-one correspondence.

Figure 7:
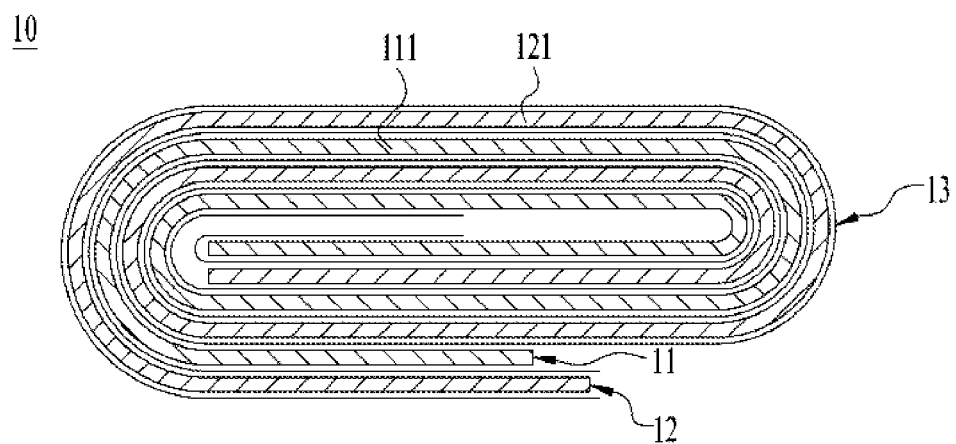
FIG. 7 is a schematic cross-sectional view of still another electrode assembly according to an embodiment of this application.

FIG. 7 is a schematic cross-sectional view of still another electrode assembly 10 according to an embodiment of this application. As shown in FIG. 7, the electrode assembly 10 according to this embodiment of this application is a winding structure and includes a first electrode plate 11, a second electrode plate 12, and a separator 13.

In some embodiments, the electrode assembly 10 includes one first electrode plate 11 and one second electrode plate 12, which are in a continuous strip structure. The separator 13 is provided in two, which are referred to as a first separator and a second separator respectively. The first electrode plate 11, the first separator, the second electrode plate 12, and the second separator are stacked sequentially and wound around a winding axis two or more times to form the electrode assembly 10, and the electrode assembly 10 is flat-shaped. After the electrode assembly 10 is formed through winding, a first body portion 111 of the first electrode plate 11 and a second body portion 121 of the second electrode plate 12 are stacked, and the first body portion 111 and the second body portion 121 are stacked in a direction perpendicular to the winding axis.

The first body portion 111 includes a plurality of first flat segments and a plurality of first bending segments, the plurality of first flat segments are stacked, and the first bending segment is at least partially bent to be arc-shaped and is connected to the first flat segment. Optionally, each of the first bending segments is connected to two first flat segments. The second body portion 121 includes a plurality of second flat segments and a plurality of second bending segments, the plurality of second flat segments are stacked in a stacking direction, and the second bending segment is at least partially bent to be arc-shaped and connected to the second flat segment. Optionally, each of the second bending segments is connected to two of the second flat segments. The first flat segments and the second flat segments are stacked, and the first bending segments and the second bending segments are stacked.

Figure 8:
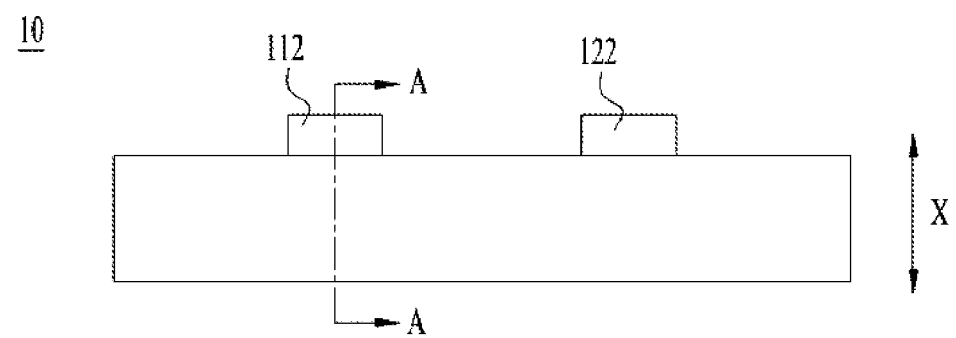
FIG. 8 is a schematic front view of an electrode assembly according to an embodiment of this application.
Figure 9:
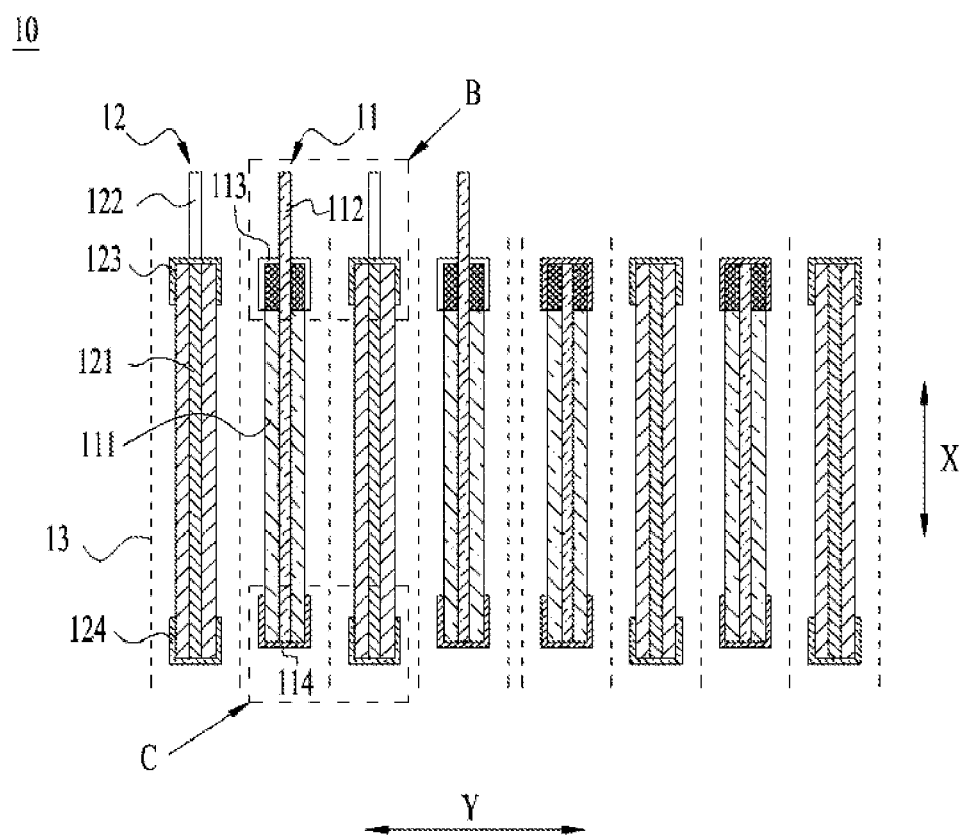
FIG. 9 is a schematic cross-sectional view of the electrode assembly in FIG. 8 along line A-A.
Figure 10:
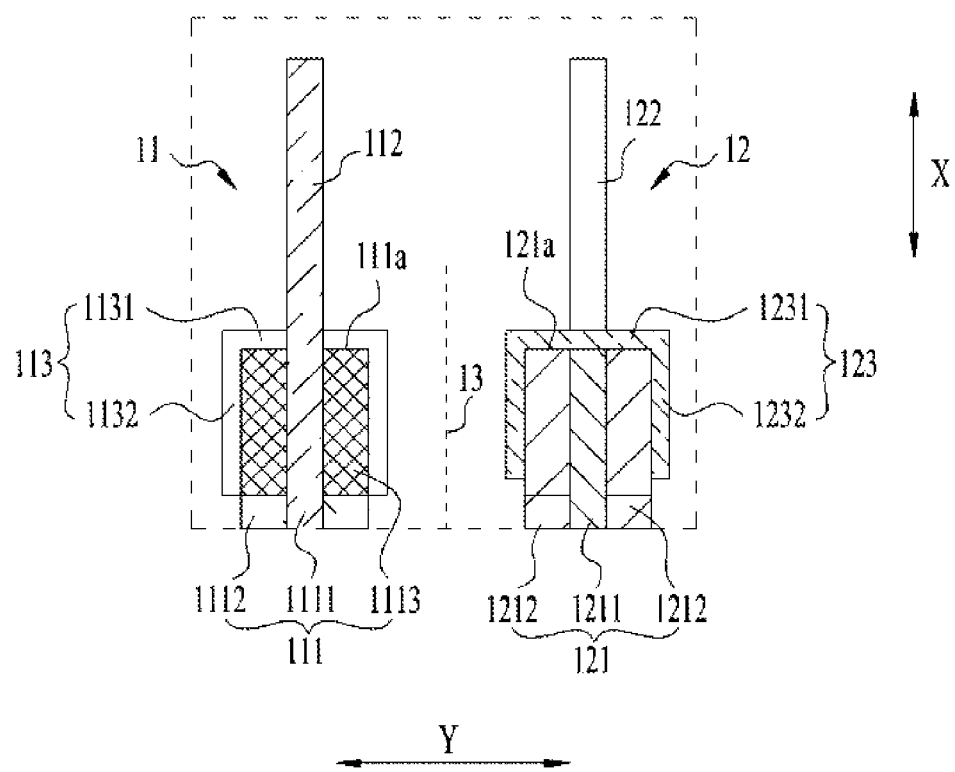
FIG. 10 is a schematic enlarged view of the electrode assembly in FIG. 9 in block B.
Figure 11:
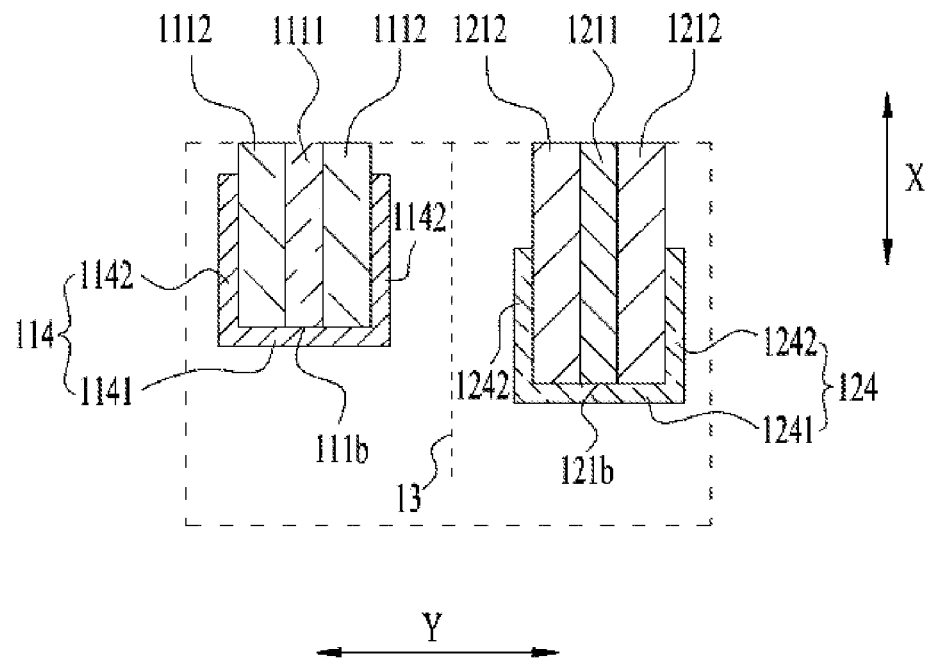
FIG. 11 is a schematic enlarged view of the electrode assembly in FIG. 9 in block C.

FIG. 8 is a schematic front view of an electrode assembly 10 according to an embodiment of this application; FIG. 9 is a schematic cross-sectional view of the electrode assembly 10 in FIG. 8 along line A-A; FIG. 10 is a schematic enlarged view of the electrode assembly 10 in FIG. 9 in block B; and FIG. 11 is a schematic enlarged view of the electrode assembly 10 in FIG. 9 in block C.

As shown in FIG. 8 to FIG. 11, in some embodiments, an electrode assembly 10 includes at least one first electrode plate 11 and at least one second electrode plate 12. For example, the electrode assembly 10 shown in the figures is winding structure, and the first electrode plate 11 and the second electrode plate 12 each are provided in one.

The first electrode plate 11 includes a first body portion 111 and a first tab 112 protruding from the first body portion 111, and the second the electrode plate 12 includes a second body portion 121 and a second tab 122 protruding from the second body portion 121. The first body portion 111 and the second body portion 121 are stacked. The first body portion 111 has two end portions that are disposed opposite to each other in a first direction X, and the second body portion 121 has two end portions that are disposed opposite to each other in the first direction X. For ease of distinction, the two end portions of the first body portion 111 are referred to as a first end portion 111a and a third end portion 111b, and the two end portions of the second body portion 121 are referred to as a second end portion 121a and a fourth end portion 121b. The first body portion 111 and the second body portion 121 are stacked in a direction Y perpendicular to the first direction X. The second end portion 121a is an end of the second body portion 121 close to the first end portion 111a, and the fourth end portion 121b is an end of the second body portion 121 close to the third end portion 111b.

The first tab 112 is connected to the first end portion 111a; and the second end portion 121a is closer to the first tab 112 in the first direction X than the fourth end portion 121b. In some embodiments, as shown in the figures, the second tab 122 may be connected to the second end portion 121a, and in this case, the first tab 112 and the second tab 122 are located at a same end of the electrode assembly 10 in the first direction X. In some other embodiments, the second tab 122 may alternatively be connected to the fourth end portion 121b, and in this case, the first tab 112 and the second tab 122 are located at two ends of the electrode assembly 10 in the first direction X respectively.

The first body portion 111 includes a first current collection zone 1111 and a first active material layer 1112, where the first active material layer 1112 is applied on a surface of the first current collection zone 1111. The first active material layer 1112 includes a first conductive agent, a first binder, and a first active material, where the first active material is used to intercalate and deintercalate metal ions. Materials for all segments of the first body portion 111 are determined according to a polarity of the first electrode plate 11. For example, for a lithium-ion battery cell, under the condition that the first electrode plate 11 is a positive electrode plate, the first current collection zone 1111 may be made of aluminum, and the first active material may be lithium cobaltate, lithium iron phosphate, ternary lithium, lithium manganate, or the like; and under the condition that the first electrode plate 11 is a negative electrode plate, the first current collection zone 1111 may be made of copper, and the first active material may be carbon, silicon, or the like.

The second body portion 121 includes a second current collection zone 1211 and a second active material layer 1212, where the second active material layer 1212 is applied on a surface of the second current collection zone 1211. The second active material layer 1212 includes a second conductive agent, a second binder, and a second active material, where the second active material is used to intercalate or deintercalate metal ions. Materials for all parts of the second body portion 121 are determined according to a polarity of the second electrode plate 12. For example, for a lithium-ion battery cell, under the condition that the second electrode plate 12 is a positive electrode plate, the second current collection zone 1211 may be made of aluminum, and the second active material may be lithium cobaltate, lithium iron phosphate, ternary lithium, lithium manganate, or the like; and under the condition that the second electrode plate 12 is a negative electrode plate, the second current collection zone 1211 may be made of copper, and the second active material may be carbon, silicon, or the like.

The first tab 112 is connected to the first current collection zone 1111. The first tab 112 may be integrally formed with the first current collection zone 1111, or the first tab 112 and the first current collection zone 1111 may be separately formed. For example, the first tab 112 may be connected to the first current collection zone 1111 by using a method such as welding. The second tab 122 is connected to the second current collection zone 1211. The second tab 122 may be integrally formed with the second current collection zone 1211, or the second tab 122 and the second current collection zone 1211 may be separately formed. For example, the second tab 122 may be connected to the second current collection zone 1211 by using a method such as welding.

To ensure that no fuse blows as a large current flows, a plurality of first tabs 112 are stacked together, and a plurality of second tabs 122 are stacked together.

The first end portion 111a includes one end portion of the first current collection zone 1111 in the first direction X, and the third end portion 111b includes the other end portion of the first current collection zone 1111 in the first direction X. The second end portion 121a includes one end portion of the second current collection zone 1211 in the first direction X, and the fourth end portion 121b includes the other end portion of the second current collection zone 1211 in the first direction X.

The inventors have found that during assembly and use of a battery cell 5, because the first tab 112 is relatively thin, the first tab 112 may be bent, which may result in contact of the first tab 112 and the second end portion 121a. In this case, the first tab 112 is and the second body portion 121 are connected, causing a risk of short circuits.

In view of this, the inventors have improved the structure of the electrode assembly 10 so as to reduce the risk of short circuits.

As shown in FIG. 10 and FIG. 11, in the electrode assembly 10 according to this embodiment of this application, the second electrode plate 12 further includes a second insulation portion 123 connected to the second body portion 121, where the second insulation portion 123 covers at least part of the second end portion 121a so as to separate the first tab 112 from the second end portion 121a when the first tab 112 is bent. In this embodiment of this application, the second insulation portion 123 is provided to reduce a risk of the first tab 112 contacting the second end portion 121a when the first tab 112 is bent, improving safety performance of the electrode assembly 10.

During a process of forming, the first electrode plate 11 and the electrode plate 12 usually need to be cut. After being formed through cutting, end portions of the first current collection zone 1111 and end portions of the second current collection zone 1211 will have burrs (it means that the first end portion 111a, the second end portion 121a, the third end portion 111b, and the fourth end portion 121b have burrs), making the burrs pierce the separator 13 and causing a risk of short circuits. However, in this application, the second insulation portion 123 can cover at least part of the second end portion 121a, thus reducing a risk of burrs piercing the separator 13 and improving safety performance.

The inventors have further found that, when the first tab 112 is bent, a root of the first tab 112 close to the first body portion 111 may be inserted between the first body portion 111 and the second body portion 121, and in such case, the first tab 112 and the second body portion 121 are connected, causing the risk of short circuits. In view of this, the inventors have improved the structure of the second electrode plate 12 so as to reduce the risk of short circuits. Specifically, in some embodiments, the second insulation portion 123 includes a second coverage zone 1231 and a second connection zone 1232 connected to the second coverage zone 1231, where the second coverage zone 1231 is disposed on a side of the second body portion 121 in the first direction X and covers at least part of the second end portion 121a, and the second connection zone 1232 is connected to the second body portion 121. The second connection zone 1232 is at least partially located between the first body portion 111 and the second body portion 121 so as to separate the second body portion 121 from the first tab 112 when the first tab 112 is inserted between the first body portion 111 and the second body portion 121. The second connection zone 1232 can reduce a risk of the first tab 112 contacting the second body portion 121 when the first tab 112 is inserted between the first body portion 111 and the second body portion 121, improving safety performance.

In some embodiments, the second connection zone 1232 is provided in two, which are disposed on two sides of the second body portion 121 in a stacking direction Y respectively. The second coverage zone 1231 and the two second connection zones 1232 form a U-shaped structure and cover part of the second body portion 121 close to the first tab 112. The two second connection zones 1232 can increase connection area between the second insulation portion 123 and the second body portion 121, enhancing connection strength between the second insulation portion 123 and the second body portion 121, and reducing a risk of the second insulation portion 123 coming off.

In some embodiments, the second insulation portion 123 is adhered to the second body portion 121. In some examples, the second body portion 121 may be coated with insulation glue, and the insulation glue forms the second insulation portion 123 after curing. In some other embodiments, the second insulation portion 123 may be an insulation tape.

In some embodiments, thickness of the second insulation portion 123 is greater than thickness of the separator 13. The second insulation portion 123 has greater thickness and strength than the separator 13, and is difficult to be pierced by burrs on the second end portion 121a, thus reducing a risk of short circuits.

A size of the second connection zone 1232 in the first direction X is L1. A smaller L1 indicates lower connection strength between the second insulation portion 123 and the second body portion 121 and a higher risk of the second insulation portion 123 coming off. Under the condition that the second insulation portion 123 is too small, the second insulation portion 123 has relatively high requirements for coating process. A larger L1 indicates larger space occupied by the second insulation portion 123 and lower energy density of the battery cell 5. The inventors have comprehensively considered the connection strength and energy density, and a value of L1 is set in a range of 0.3 mm to 6 mm. Optionally, the value of L1 ranges from 1 mm to 3 mm.

Smaller thickness of the second insulation portion 123 indicates lower strength, making the burrs on the second end portion 121a pierce the second insulation portion 123 easier; and under the condition that the thickness of the second insulation portion 123 is too small, the burrs pierces the second insulation portion 123 pretty easily and good insulation effect is unable to be ensured. Greater thickness of the second insulation portion 123 indicates larger space occupied by the second insulation portion 123 and a larger gap between the first body portion 111 and the second body portion 121. Under the condition that the gap between the first body portion 111 and the second body portion 121 is too large, lithium precipitation is easy to occur. During a cycling process of the battery cell 5, the first body portion 111 and the second body portion 121 will press the second connection zone 1232. If thickness of the second connection zone 1232 is too large, the second connection zone 1232 is caused to excessively press the first body portion 111 and the second body portion 121, causing the first body portion 111 and the second body portion 121 to be cracked. The inventors have comprehensively considered that in some embodiments, thickness of the second insulation portion 123 is set in a range of 0.005 mm to 0.2 mm. Optionally, thickness of the second insulation portion 123 ranges from 0.02 mm to 0.1 mm.

A size of the second body portion 121 in the first direction X is L2. A larger L2 makes the second body portion 121 swell more during the cycling of the battery cell 5, a greater force applied on the second insulation portion 123 if the second body portion 121 is deformed due to swelling, and a higher risk of separating the second body portion 121 from the second insulation portion 123; and a smaller L2 makes a higher ratio of L1 to L2, and greater percentage of energy loss caused by the second insulation portion 123. The inventors have comprehensively considered that in some embodiments, the ratio of L1 to L2 is set in a range of 0.5% to 6%. That means a ratio of a size of the second connection zone 1232 in the first direction X to a size of the second body portion 121 in the first direction X ranges from 0.5% to 6%.

In some embodiments, the second insulation portion 123 has a porous structure for metal ions to pass through. The metal ions are able to pass through the second insulation portion 123 to reduce resistance of the second insulation portion 123 to transport the metal ions, helping intercalate and deintercalate the metal ions.

In some embodiments, the first electrode plate 11 further includes a first insulation portion 113, where the first insulation portion 113 includes a first coverage zone 1131 and a first connection zone 1132 connected to the first coverage zone 1131, and the first coverage zone 1131 is disposed on a side of the first body portion 111 in the first direction X and covers at least part of the first end portion 111a. The first connection zone 1132 is at least partially located between the first body portion 111 and the second body portion 121 and is connected to the first body portion 111. The first insulation portion 113 can cover at least part of the first end portion 111a, thereby reducing a risk of burrs piercing the separator 13 and improving safety performance.

In some embodiments, there are two first connection zones 1132, and the first coverage zone 1131 and the two first connection zones 1132 form a U-shaped structure. In some embodiments, materials and structures of the first insulation portion 113 and the second insulation portion 123 are same.

In some embodiments, the second tab 122 is connected to the second end portion 121a. The first coverage zone 1131 can separate the second tab 122 from the first end portion 111a when the second tab 122 is bent, reducing a risk of the second tab 122 contacting the first body portion 111 and improving safety performance of an electrode assembly 10. The first connection zone 1132 is provided to reduce a risk of the second tab 122 contacting the first body portion 111 when the second tab 122 is inserted between the first body portion 111 and the second body portion 121 and improve safety performance.

In some embodiments, the first electrode plate 11 further includes a third insulation portion 114, where the third insulation portion 114 is connected to the first body portion 111 and covers at least part of the third end portion 111b. The third insulation portion 114 can cover at least part of the third end portion 111b, thereby reducing a risk of burrs piercing the separator 13 and improving safety performance.

In some embodiments, the third insulation portion 114 includes a third coverage zone 1141 and a third connection zone 1142 connected to the third coverage zone 1141. The third coverage zone 1141 is disposed on a side of the first body portion 111 in the first direction X and covers at least part of the third end portion 111b. The third connection zone 1142 is at least partially located between the first body portion 111 and the second body portion 121 and is connected to the first body portion 111. In some embodiments, the third insulation portion 114 is of a U-shaped structure and includes two third connection zones 1142, and the two third connection zones 1142 are located on two sides of the first body portion 111 respectively.

In some embodiments, the second electrode plate 12 further includes a fourth insulation portion 124, where the fourth insulation portion 124 is connected to the second body portion 121 and covers at least part of the fourth end portion 121b. The fourth insulation portion 124 can cover at least part of the fourth end portion 121b, thereby reducing a risk of burrs piercing the separator 13 and improving safety performance.

In some embodiments, the fourth insulation portion 124 includes a fourth coverage zone 1241 and a fourth connection zone 1242 connected to the fourth coverage zone 1241, where the fourth coverage zone 1241 is disposed on a side of the second body portion 121 in the first direction X and covers at least part of the fourth end portion 121b. The fourth connection zone 1242 is at least partially located between the first body portion 111 and the second body portion 121 and is connected to the second body portion 121. In some embodiments, the fourth insulation portion 124 is of a U-shaped structure and includes two fourth connection zones 1242, and the two fourth connection zones 1242 are located on two sides of the second body portion 121 respectively.

In some embodiments, the first insulation portion 113, the third insulation portion 114, and the fourth insulation portion 124 each have a porous structure for metal ions to pass through.

In some embodiments, the first electrode plate 11 is a positive electrode plate, and the second electrode plate 12 is a negative electrode plate. During charging, metal ions deintercalated from the first active material layer 1112 need to be intercalated into the second active material layer 1212. If the second active material layer 1212 provides insufficient space for lithiation, a risk of lithium precipitation is easily caused. The first connection zone 1132 and the second connection zone 1232 partly block transport of metal ions, therefore, the metal ions are mainly deintercalated from a portion of the first active material layer 1112 that is not covered by the first connection zone 1132, and then are intercalated into a portion of the second active material layer 1212 that is not covered by the second connection zone 1232. In some embodiments, in a direction pointing away from the first tab 112 and parallel to the first direction X, an edge of the second connection zone 1232 farther away from the second coverage zone 1231 does not exceed an edge of the first connection zone 1132 farther away from the first coverage zone 1131. In this way, the portion of the second active material layer 1212 that is not covered by the second connection zone 1232 can cover the portion of the first active material layer 1112 that is not covered by the first connection zone 1132, providing more space for intercalating metal ions and reducing a risk of lithium precipitation.

In some embodiments, in a direction pointing away from the first tab 112 and parallel to the first direction X, a gap between the edge of the second connection zone 1232 farther away from the second coverage zone 1231 and the edge of the first connection zone 1132 farther away from the first coverage zone 1131 is greater than 0.05 mm, so that the portion of the second active material layer 1212 that is not covered by the second connection zone 1232 has a larger area for intercalating more metal ions, reducing the risk of lithium precipitation.

In some embodiments, the first body portion 111 further includes a first protective layer 1113, where the first protective layer 1113 is applied on a surface of the first current collection zone 1111 and is connected to the first active material layer 1112, and the first protective layer 1113 is located on a side of the first active material layer 1112 in the first direction X and close to the first tab 112. The first protective layer 1113 is an insulation layer. In some examples, the first protective layer 1113 includes a binder and an insulation material, and the insulation material includes at least one of aluminum oxide and aluminum hydroxide oxide.

In some embodiments, a root of the first tab 112 close to the first body portion 111 is provided with a second protective layer (not shown in the figure), and the second protective layer can improve insulation of the root of the first tab 112 close to the first body portion 111. The first protective layer 1113 and the second protective layer are integrally formed.

In some embodiments, the first tab 112 is made by using cutting process. The first protective layer 1113 and the second protective layer can reduce burrs at a cutting position in the cutting process of the first tab 112.

In some embodiments, the first connection zone 1132 is fastened to the first protective layer 1113, and in a direction pointing away from the first tab 112 and parallel to the first direction X, an edge of the first connection zone 1132 farther away from the first coverage zone 1131 does not exceed the first protective layer 1113. In other words, the first connection zone 1132 does not cover the first active material layer 1112, and the first connection zone 1132 does not block deintercalating metal ions from the first active material layer 1112, improving cycling performance of the electrode assembly 10.

In some embodiments, in a direction close to the first tab 112 and parallel to the first direction X, an edge of the fourth connection zone 1242 farther away from the fourth coverage zone 1241 does not exceed an edge of the third connection zone 1142 farther away from the third coverage zone 1141. In some embodiments, in the direction close to the first tab 112 and parallel to the first direction X, a gap between the edge of the fourth connection zone 1242 farther away from the fourth coverage zone 1241 and the edge of the third connection zone 1142 farther away from the third coverage zone 1141 is greater than 0.05 mm.

Figure 12:
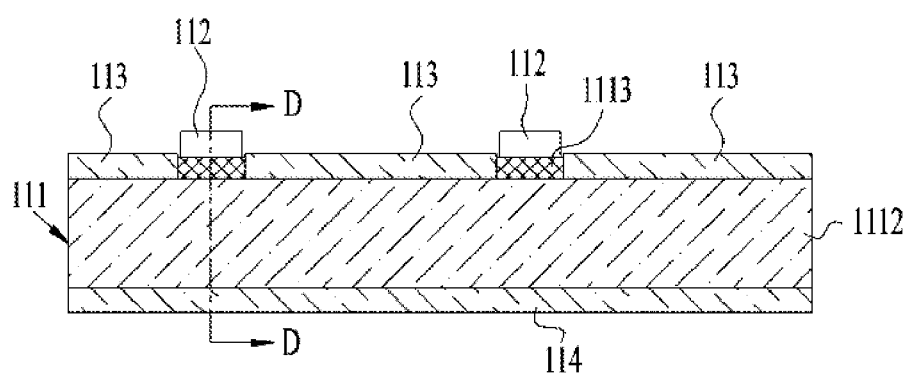
FIG. 12 is a schematic structural diagram of a first electrode plate in an unwound state according to an embodiment of this application.
Figure 13:
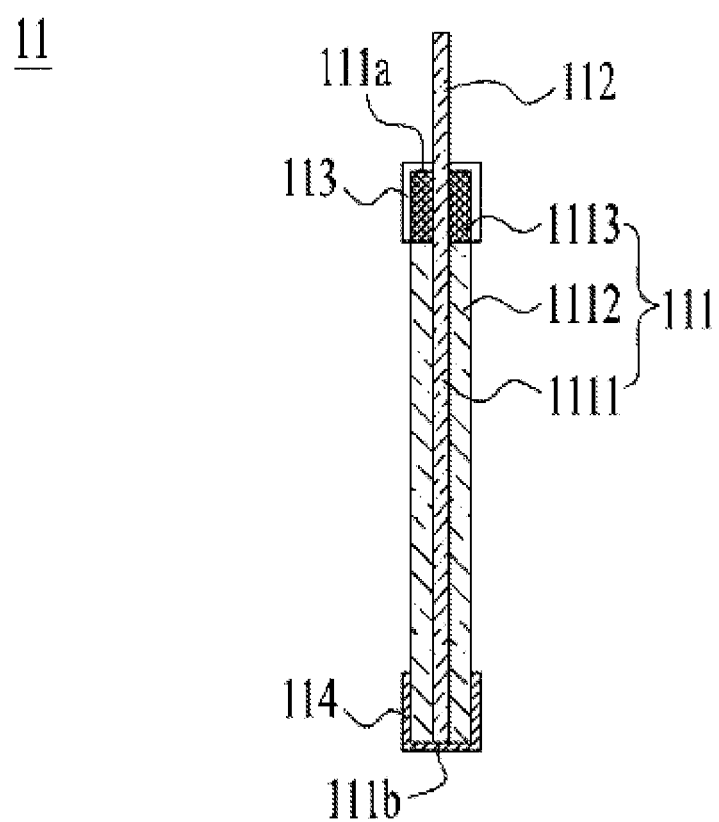
FIG. 13 is a schematic cross-sectional view of the first electrode plate in FIG. 12 along line D-D.

FIG. 12 is a schematic structural diagram of a first electrode plate 11 in an unwound state according to an embodiment of this application; and FIG. 13 is a schematic cross-sectional view of the first electrode plate 11 in FIG. 12 along line D-D.

As shown in FIG. 12 and FIG. 13, in an unwound state, the first electrode plate 11 extends along a length direction of the first electrode plate 11 itself. In some embodiments, there may be a plurality of first insulation portions 113, where the plurality of first insulation portions 113 and a plurality of first tabs 112 are arranged alternatively in a length direction of the first electrode plate 11. Each first insulation portion 113 covers part of the first end portion 111a.

In some embodiments, there is one third insulation portion 114, where the third insulation portion 114 completely covers the third end portion 111b.

Figure 14:
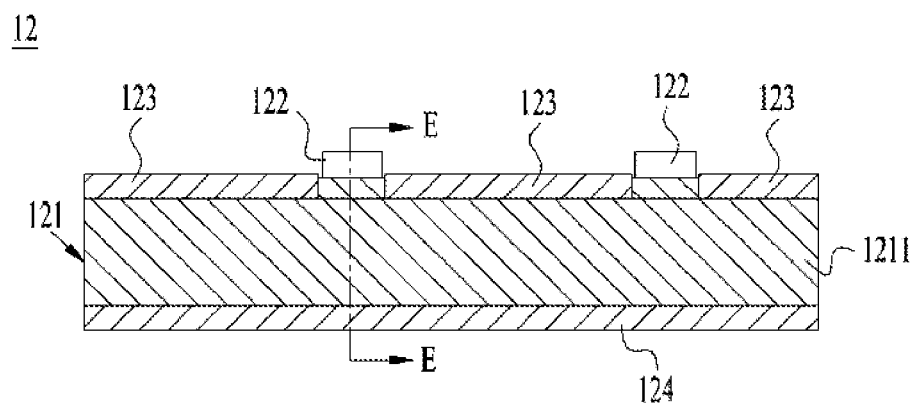
FIG. 14 is a schematic structural diagram of a second electrode plate in an unwound state according to an embodiment of this application.
Figure 15:
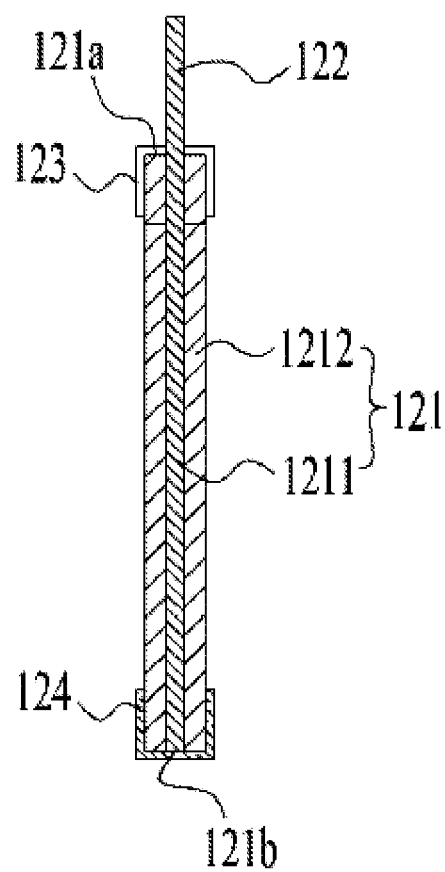
FIG. 15 is a schematic cross-sectional view of the second electrode plate in FIG. 14 along line E-E.

FIG. 14 is a schematic structural diagram of a second electrode plate 12 in an unwound state according to an embodiment of this application; and FIG. 15 is a schematic cross-sectional view of the second electrode plate 12 in FIG. 14 along line E-E.

As shown in FIG. 14 and FIG. 15, in an unwound state, the second electrode plate 12 extends in a length direction of the second electrode plate 12 itself. In some embodiments, there may be a plurality of second insulation portions 123, where the plurality of second insulation portions 123 and a plurality of second tabs 122 are arranged alternatively in a length direction of the second electrode plate 12. Each second insulation portion 123 covers part of the second end portion 121a.

In some embodiments, there is one fourth insulation portion 124, where the fourth insulation portion 124 completely covers the fourth end portion 121b.

Figure 16:
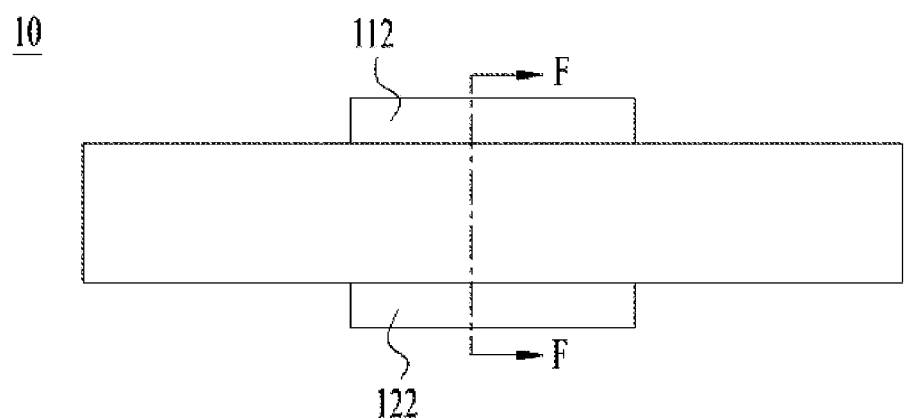
FIG. 16 is a schematic front view of another electrode assembly according to an embodiment of this application.
Figure 17:
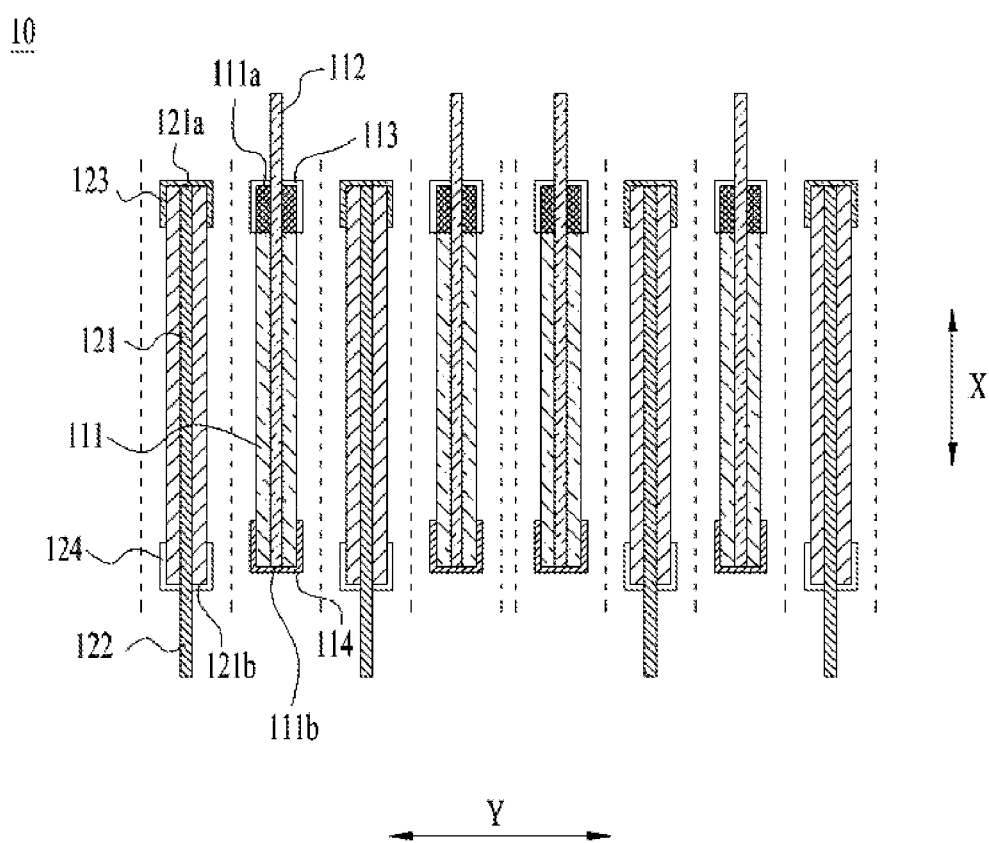
FIG. 17 is a schematic cross-sectional view of the electrode assembly in FIG. 16 along line F-F.

FIG. 16 is a schematic front view of another electrode assembly 10 according to an embodiment of this application; and FIG. 17 is a schematic cross-sectional view of the electrode assembly 10 in FIG. 16 along line F-F.

As shown in FIG. 16 and FIG. 17, in some embodiments, a second tab 122 is connected to a fourth end portion 121b. A third insulation portion 114 can separate the second tab 122 and a third end portion 111b when the second tab 122 is bent, reducing a risk of the second tab 122 contacting the first body portion 111 and improving safety performance of the electrode assembly 10. When the second tab 122 is inserted between the first body portion 111 and the second body portion 121, the third insulation portion 114 can also reduce the risk of the second tab 122 contacting the first body portion 111, improving safety performance.

Although this application has been described with reference to some embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. An electrode assembly, comprising:
a first electrode plate comprising a first body portion, a first tab, and a first insulation portion, the first body portion having a first end portion in a first direction, the first tab being coupled to the first end portion, the first body portion comprising a first current collection zone, a first active material layer, and a protective layer, the first active material layer being applied on a surface of the first current collection zone, the protective layer being applied on a surface of the first current collection zone and coupled to the first active material layer, a first surface of the protective layer parallel to the first direction and away from the first current collection zone being coplanar with a second surface of the first active material layer parallel to the first direction and away from the first current collection zone, and the first surface and the second surface not overlapping with each other in a stacking direction perpendicular to the first direction;

a second electrode plate comprising a second body portion, a second tab, and a second insulation portion coupled to the second body portion, the first body portion and the second body portion being stacked in the stacking direction perpendicular to the first direction, the second body portion having a second end portion located at a same side as the first tab in the first direction, and the second insulation portion covering at least part of the second end portion; and a separator configured to separate the first electrode plate and the second electrode plate;

wherein:

the first insulation portion comprises a first coverage zone and a first connection zone coupled to the first coverage zone, the first coverage zone is disposed on a side of the first body portion in the first direction and covers an end surface of the protective layer, and the first connection zone is fixed to the protective layer;

the second insulation portion comprises a second coverage zone and a second connection zone coupled to the second coverage zone, the second coverage zone is disposed on a side of the second body portion in the first direction and covers at least part of the second end portion;

the second body portion comprises a second current collection zone and a second active material layer, the second active material layer is applied on a surface of the second current collection zone;

the second coverage zone is located between the second tab and the second current collection zone; and the second connection zone is connected to the second body portion, and a ratio of a size of the second connection zone in the first direction to a size of the second body portion in the first direction ranges from 0.5% to 6%.

2. The electrode assembly according to claim 1, wherein: the second connection zone is at least partially located between the first body portion and the second body portion so as to separate the second body portion from the first tab when the first tab is inserted between the first body portion and the second body portion.

3. The electrode assembly according to claim 2, wherein the second connection zone is one of two second connection zones of the second insulation portion, and the two second connection zones are disposed on two sides of the second body portion in the stacking direction, respectively.

4. The electrode assembly according to claim 2, wherein: the first connection zone is at least partially located between the first body portion and the second body portion and is connected to the first body portion.

5. The electrode assembly according to claim 4, wherein: the first body portion further has a third end portion in the first direction farther away from the first end portion, and the second body portion further has a fourth end portion in the first direction farther away from the second end portion; and the second tab is coupled to the second end portion or the fourth end portion.

6. The electrode assembly according to claim 5, wherein: the first electrode plate further comprises a third insulation portion, the third insulation portion being coupled to the first body portion and covering at least part of the third end portion.

7. The electrode assembly according to claim 5, wherein: the second electrode plate further comprises a third insulation portion, the third insulation portion being coupled to the second body portion and covering at least part of the fourth end portion.

8. The electrode assembly according to claim 4, wherein in a direction pointing away from the first tab and parallel to the first direction, an edge of the second connection zone farther away from the second coverage zone does not exceed an edge of the first connection zone farther away from the first coverage zone.

9. The electrode assembly according to claim 8, wherein in the direction pointing away from the first tab and parallel to the first direction, a gap between the edge of the second connection zone farther away from the second coverage zone and the edge of the first connection zone farther away from the first coverage zone is greater than 0.05 mm.

10. The electrode assembly according to claim 1, wherein the second insulation portion has a porous structure for metal ions to pass through.

11. The electrode assembly according to claim 1, wherein a thickness of the second insulation portion is greater than a thickness of the separator.

12. The electrode assembly according to claim 1, wherein: in a direction pointing away from the first tab and parallel to the first direction, an edge of the first connection zone farther away from the first tab is coplanar with an edge of the protective layer father away from the first tab.

13. The electrode assembly according to claim 1, wherein: the protective layer comprises a binder and an insulation material, and the insulation material comprises at least one of aluminum oxide or aluminum hydroxide oxide.

14. The electrode assembly according to claim 1, wherein: a thickness of the second insulation portion is in a range of 0.005 mm to 0.2 mm.

15. The electrode assembly according to claim 1, wherein: the protective layer only covers an end of the second active material layer in the first direction, the protective layer is not in contact with the first tab.

16. A battery cell, comprising:

a housing with an accommodating cavity and an opening;

an electrode assembly accommodated in the accommodating cavity and comprising:

a first electrode plate comprising a first body portion, a first tab, and a first insulation portion, the first body portion having a first end portion in a first direction, the first tab being coupled to the first end portion, the first body portion comprising a first current collection zone, a first active material layer, and a protective layer, the first active material layer being applied on a surface of the first current collection zone, the protective layer being applied on a surface of the first current collection zone and coupled to the first active material layer, a first surface of the protective layer parallel to the first direction and away from the first current collection zone being coplanar with a second surface of the first active material layer parallel to the first direction and away from the first current collection zone, and the first surface and the second surface not overlapping with each other in a stacking direction perpendicular to the first direction;

a second electrode plate comprising a second body portion, a second tab, and a second insulation portion coupled to the second body portion, the first body portion and the second body portion being stacked in the stacking direction perpendicular to the first direction, the second body portion having a second end portion located at a same side as the first tab in the first direction, and the second insulation portion covering at least part of the second end portion; and a separator configured to separate the first electrode plate and the second electrode plate; and a cover plate configured to close the opening of the housing;

wherein:

the first insulation portion comprises a first coverage zone and a first connection zone coupled to the first coverage zone, the first coverage zone is disposed on a side of the first body portion in the first direction and covers an end surface of the protective layer, and the first connection zone is fixed to the protective layer;

the second insulation portion comprises a second coverage zone and a second connection zone coupled to the second coverage zone, the second coverage zone is disposed on a side of the second body portion in the first direction and covers at least part of the second end portion;

the second body portion comprises a second current collection zone and a second active material layer, the second active material layer is applied on a surface of the second current collection zone;

the second coverage zone is located between the second tab and the second current collection zone; and the second connection zone is connected to the second body portion, and a ratio of a size of the second connection zone in the first direction to a size of the second body portion in the first direction ranges from 0.5% to 6%.

17. The battery cell according to claim 16, wherein:
the second connection zone is at least partially located between the first body portion and the second body portion so as to separate the second body portion from the first tab when the first tab is inserted between the first body portion and the second body portion.

18. A battery, comprising:
a box body; and
the battery cell according to claim 16 and accommodated in the box body.

19. An electric apparatus, comprising the battery according to claim 18, the battery being configured to provide power to the electric apparatus.

20. An electrode assembly, comprising:

a first electrode plate comprising a first body portion and a first tab, the first body portion having a first end portion in a first direction, and the first tab being coupled to the first end portion, the first body portion comprising a first current collection zone, a first active material layer, and a protective layer, the first active material layer being applied on a surface of the first current collection zone, the protective layer being applied on a surface of the first current collection zone and coupled to the first active material layer, the protective layer comprising a binder and an insulation material, and the insulation material comprising aluminum hydroxide oxide;

a second electrode plate comprising a second body portion, a second tab, and an insulation portion coupled to the second body portion, the first body portion and the second body portion being stacked in a stacking direction perpendicular to the first direction, the second body portion having a second end portion located at a same side as the first tab in the first direction, and the insulation portion covering at least part of the second end portion; and a separator configured to separate the first electrode plate and the second electrode plate;

wherein:

the insulation portion comprises a coverage zone and a connection zone coupled to the coverage zone, the coverage zone is disposed on a side of the second body portion in the first direction and covers at least part of the second end portion;

the second body portion comprises a second current collection zone and a second active material layer, the second active material layer is applied on a surface of the second current collection zone;

the coverage zone is located between the second tab and the second current collection zone; and the connection zone is connected to the second body portion, and a ratio of a size of the connection zone in the first direction to a size of the second body portion in the first direction ranges from 0.5% to 6%.

* * * * *